(12) United States Patent
Favagrossa

(10) Patent No.: US 11,064,799 B2
(45) Date of Patent: Jul. 20, 2021

(54) BRUSH FOR WASHING PLANT

(71) Applicant: FAVAGROSSA EDOARDO S.R.L., Cremona (IT)

(72) Inventor: Leonardo Favagrossa, Viadana (IT)

(73) Assignee: FAVAGROSSA EDOARDO S.R.L., Casalmaggiore (IT)

( * ) Notice: Subject to any disclaimer, the term of this patent is extended or adjusted under 35 U.S.C. 154(b) by 279 days.

(21) Appl. No.: 16/333,540

(22) PCT Filed: Sep. 27, 2018

(86) PCT No.: PCT/IB2018/057485
§ 371 (c)(1),
(2) Date: Mar. 14, 2019

(87) PCT Pub. No.: WO2019/092515
PCT Pub. Date: May 16, 2019

(65) Prior Publication Data
US 2020/0100584 A1 Apr. 2, 2020

(30) Foreign Application Priority Data
Nov. 10, 2017 (IT) .......................... 102017000128683

(51) Int. Cl.
*A46B 13/00* (2006.01)
*B60S 3/06* (2006.01)
*A46B 9/00* (2006.01)

(52) U.S. Cl.
CPC ............ *A46B 9/005* (2013.01); *A46B 13/003* (2013.01); *B60S 3/063* (2013.01); *A46B 2200/3046* (2013.01)

(58) Field of Classification Search
CPC ..................... A46B 13/003; A46B 2200/3046; B60S 3/063
See application file for complete search history.

(56) References Cited

U.S. PATENT DOCUMENTS

| 5,134,742 A | 8/1992 | Ennis |
| 8,393,044 B2 | 3/2013 | Favagrossa |
| 2009/0255072 A1 | 10/2009 | Favagrossa |
| 2017/0253219 A1* | 9/2017 | Favagrossa ............... B60S 3/06 |
| 2017/0313289 A1* | 11/2017 | Belanger ................. B60S 3/063 |

FOREIGN PATENT DOCUMENTS

| KR | 100919923 | 10/2009 |
| WO | 2007072524 A1 | 6/2007 |

OTHER PUBLICATIONS

International Search Report, issued in PCT/IB2018/057485 dated Jan. 17, 2019, 13 pages.

* cited by examiner

*Primary Examiner* — Randall E Chin
(74) *Attorney, Agent, or Firm* — Pearne & Gordon LLP

(57) ABSTRACT

A brush for a vehicle washing system comprising:
flexible elements (2) intended to come into contact with the vehicle for cleaning and/or polishing and/or drying;
a central annular support (3) from which the flexible elements (2) extend;
a shaft (4) rotating about its own axis (40) of rotation, the shaft (4) crossing the central support (3) and placing the central support (3) in rotation about the axis (40) of rotation;
the central support (3) comprising a lateral surface (35), from which the flexible elements (2) extend, which is inclined with respect to the axis (40) of rotation of the shaft (4).

10 Claims, 9 Drawing Sheets

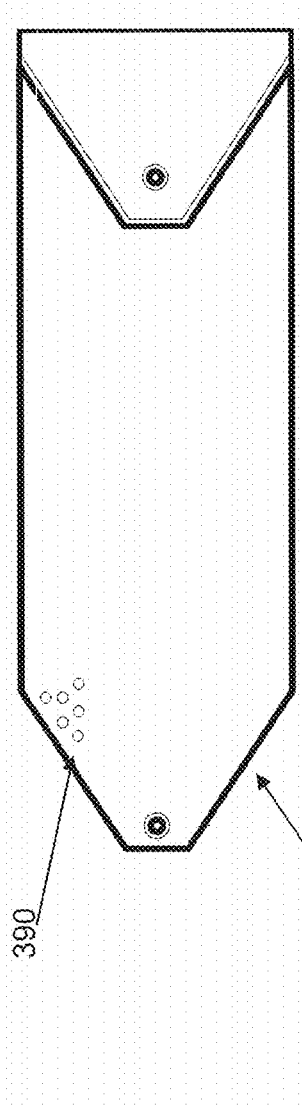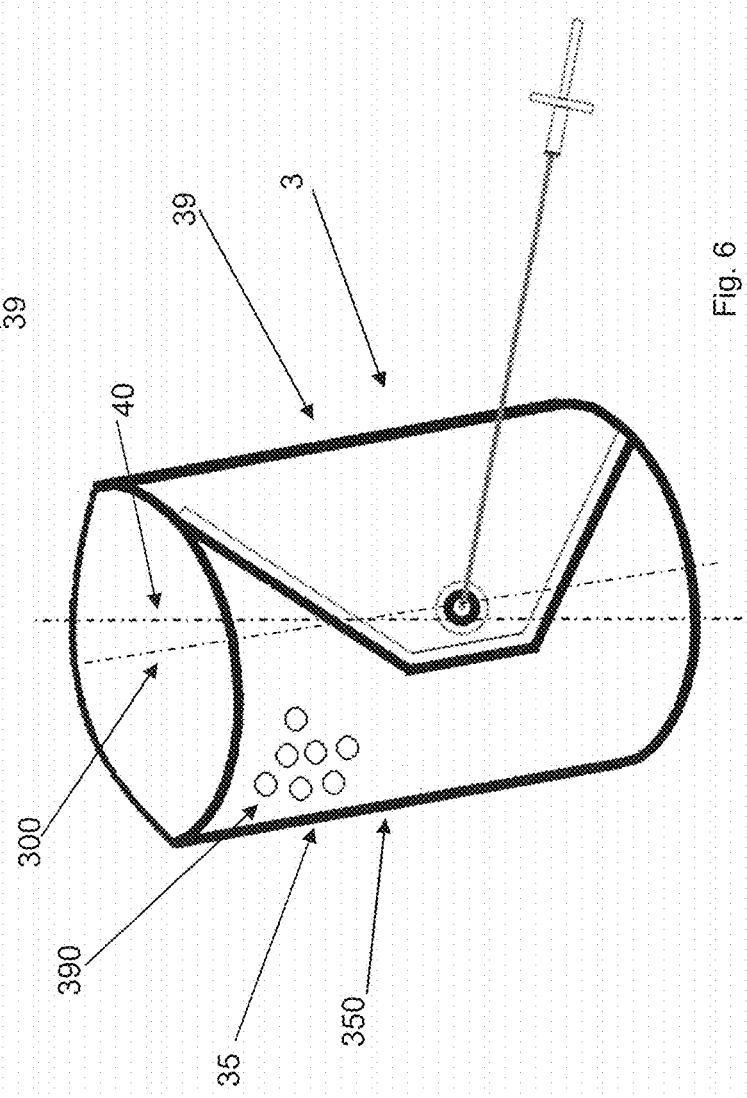

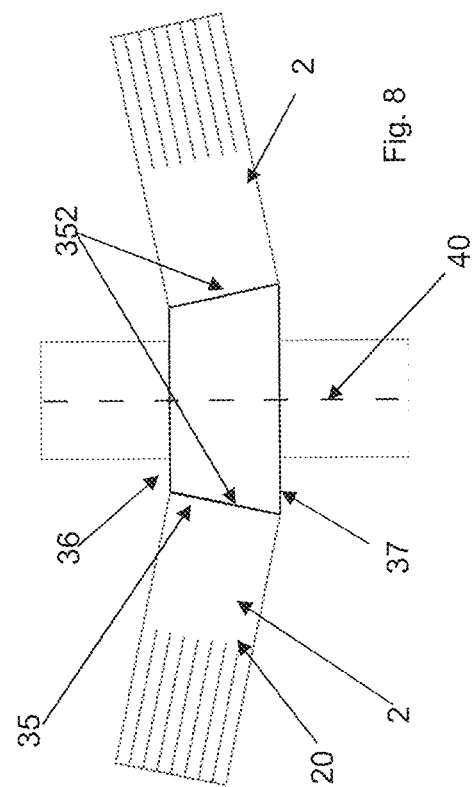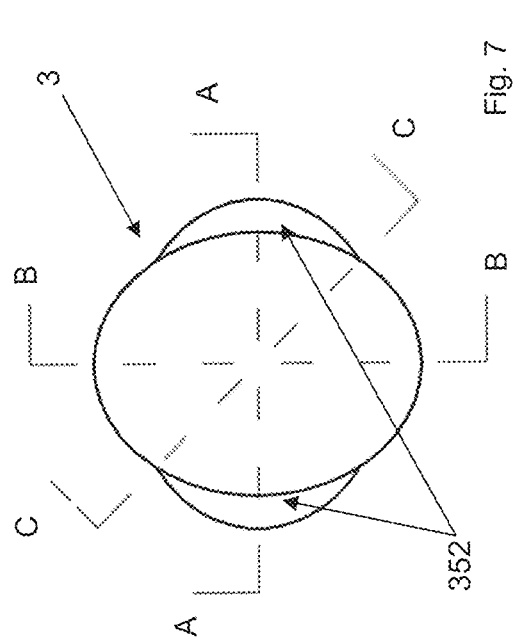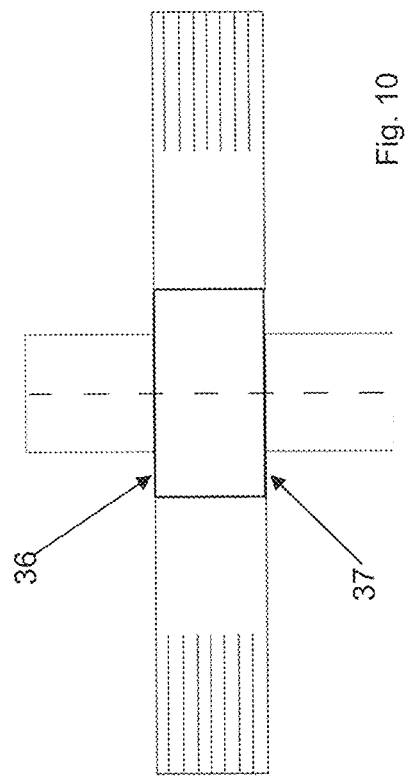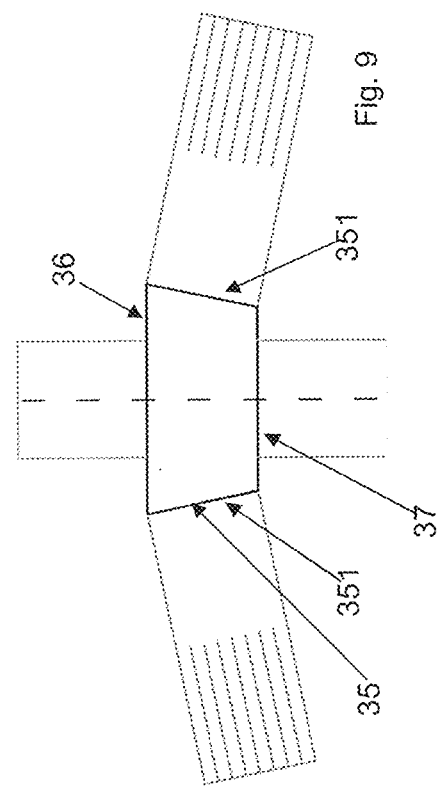

BRUSH FOR WASHING PLANT

TECHNICAL FIELD

The present invention relates to a brush for a vehicle washing system (for cars, trains, public transport vehicles, etc.). It can be used for washing and/or drying and/or polishing the bodywork of a vehicle. It can be used in particular in automatic washing systems used for example, but not only, in roadside service stations.

PRIOR ART

Brushes are known of the type comprising:
a drive shaft;
annular supports to which flexible straps are constrained; during operation the straps are arranged radially and horizontally due to the effect of the centrifugal force and come into contact with the vehicle; such supports are placed on top of each other and crossed, supported and placed in rotation by the shaft. Appropriately there is a certain distance between the straps that extend from one of said central supports and the straps the extend from a central support immediately above or below it. This is both due to dimensional constraints and to prevent the straps of two adjacent supports to overlap thus compromising the correct operation of the brush. A drawback of this technical solution is the fact that at such distance the washing of the vehicle is less effective, hence compromising the uniformity of the washing itself.

Each central annular support may have a height indicatively comprised between 8 and 35 centimetres. As previously indicated, in order to exert its action on the whole side of the vehicle it is therefore necessary to stack a high number of central annular supports on top of each other. This has an impact on the weight, which leads to higher energy consumptions. Higher weights also require appropriate structural sizing of the system. All this implies a higher cost. The cleaning and automatic washing of the bodywork of a vehicle are obtained by making various brushes of the type described above rotate so that the straps, pushed by the centrifugal force, hit the bodywork upon the interposition of water and/or washing solutions or emulsions.

OBJECT OF THE INVENTION

In this context, the technical task underpinning the present invention is to provide a brush which obviates the drawbacks of the prior art as described above.

In particular, it is an object of the present invention to provide a brush able to increase the effectiveness of the cleaning, the washing uniformity and the extension of the treated surface, allowing at the same time a reduction in noise and a more delicate effect on the paints of the vehicle.

The stated technical task and specified objects are substantially achieved by a brush comprising the technical features set forth in one or more of the appended claims.

BRIEF DESCRIPTION OF THE DRAWINGS

Further characteristics and advantages of the present invention will become more apparent from the following indicative, and hence non-limiting, description of a preferred, but not exclusive, embodiment of a brush as illustrated in the appended drawings, in which:

FIGS. 5 and 6 show a component of a brush according to the present invention and alternative to the previous ones;

FIG. 7 shows a view of a detail of the brush according to a further alternative solution;

FIG. 8 shows a sectional view according to the plane A-A of FIG. 7;

FIG. 9 shows a sectional view according to the plane B-B of FIG. 7;

FIG. 10 shows a sectional view according to the plane C-C of FIG. 7;

DETAILED DESCRIPTION OF PREFERRED EMBODIMENTS OF THE INVENTION

Figure 1B:
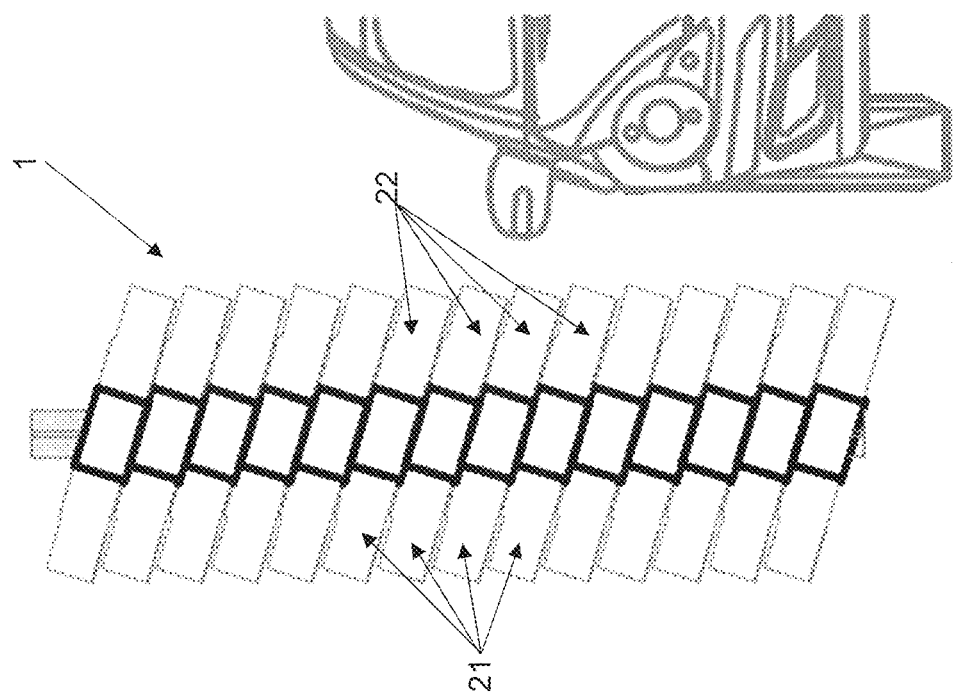
FIGS. 1a and 1b show a brush according to the present invention at two different moments during rotation.
Figure 1A:
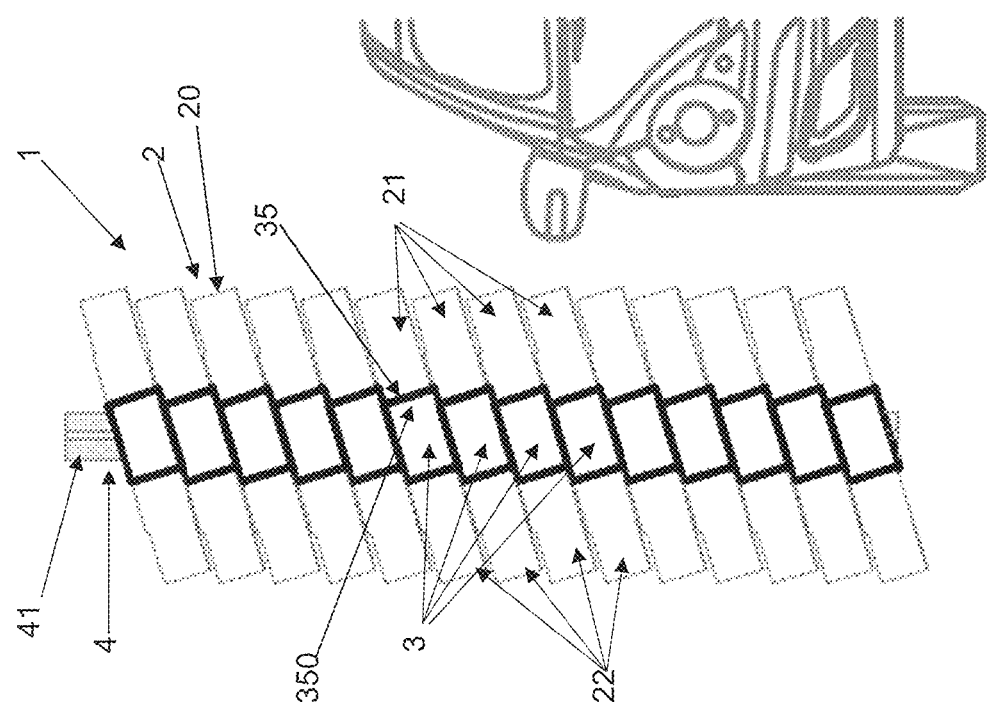

In the appended figures, reference number 1 denotes a brush for an automatic vehicle washing system.

Such brush 1 may comprise flexible elements 2 intended to come into contact with the vehicle for cleaning and/or drying and/or polishing. The flexible elements 2 may be made for example of expanded plastic material, EVA or another flexible expanded material with or without closed cells, or fabric, or non-woven fabric, and even a combination of materials.

In the solution illustrated, for example, in FIGS. 1a, 1b, 2, 3a, 3b, 4, 7-10 the flexible elements 2 comprise/coincide with straps 20.

In the preferred solution the straps 20 are fringed. In other words, there are longitudinal cuts at least at the most radially external ends of the straps 20. Such cuts can affect all or part of the longitudinal extension of the straps 20. The flexible elements 2 may comprise/coincide with longitudinal strings. They have a wire-shaped extension. As will be explained more clearly below, this could for example be the case in which the component illustrated in FIGS. 5 and 6 is used.

The brush 1 comprises a central annular support 3 about which the flexible elements 2 are applied. In the solutions illustrated in FIGS. 1a, 1b, 2, 3a, 3b, 4, 7-10 the support 3 is preferably rigid. Appropriately, the central support 3 is made of plastic material. The support 3 is preferably a cylindrical tube. As already explained above the flexible elements 2 used with the rigid support 3 are the straps 20.

In the solution illustrated by way of example in FIGS. 5 and 6 the support 3 comprises/coincides with a flexible band 39 that is annularly folded. FIG. 5 shows such band 39 in an extended configuration, FIG. 6 shows such band 39 in an operating configuration in which it is annularly folded.

The band 39 preferably comprises a plurality of housings 390 distributed about the shaft 4 (for the sake of simplicity, in FIGS. 5 and 6 only some of such housings 390 are illustrated; they are advantageously distributed along the surface of the band 39). In the solution exemplified in FIGS. 5 and 6 such housings 390 could be cavities from each of which a corresponding bunch of said longitudinal strings extends (not shown).

In an alternative solution not illustrated the flexible band 39 may comprise slots from which corresponding straps extend. Such straps are retained in the slots by corresponding retaining bars. Such bars obstruct at least partially the slot leaving two lateral slits for letting two edges of a same strap exit transversally to the prevalent extension direction (thus a similar solution to the one illustrated, although in a different context, in FIG. 4 and better described below is obtained).

The brush 1 comprises a shaft 4 that is rotatable about an axis 40 of rotation thereof. Advantageously, the axis 40 extends between the top and the bottom, in particular it is vertical. Possibly (solution not illustrated) it may be horizontally oriented.

In fact, normally in a washing system there is a combination of at least two brushes that rotate about corresponding axes that extend between the top and the bottom and at least one horizontal brush.

The shaft 4 crosses the central support 3 and places the central support 3 in rotation about the axis 40 of rotation. The shaft 4 is therefore constrained to the support 3. Shaft 4 and support 3 are therefore solidly constrained to each other. On this point, the central support 3 and the shaft 4 comprise a connection means 42 by interference/interlocking (in alternative solutions such connection could take place through threaded connection means or of another type of connection means). The connection means 42 advantageously comprises shapes afforded on a surface of the shaft 4 and/or on a surface of the central support 3 facing it.

The central support 3 comprises a lateral surface 35, from which the flexible elements 2 extend (in this document the description with reference to the lateral surface 35 could be repeated with reference to a lateral wall 350 of the support 3 incorporating such surface 35). In the preferred solution the part of the lateral surface 35 from which the flexible elements 2 extend is at least partially inclined with respect to the axis of rotation 40 of the shaft 4. Therefore, the directrix of the surface 35 is not parallel to the axis 40. On this point, the connection means 42 could comprise wedge-shaped elements (not illustrated) interposed between the shaft 4 and the lateral surface 35 of the support 3 (solution of FIGS. 1a, 1b, 2, 3a, 3b, 4, 5, 6). Advantageously such wedge-shaped elements could be made in a single body with the support 3 (solution not illustrated) or could be coupled to the shaft 4 or to the support 3. Therefore, the wedge shape allows the absence of coaxiality between the shaft 4 and the support 3.

The central support 3 comprises a retaining means 30 for retaining a strip (sheet-like body) which is folded (transversally to a preponderant extension direction). In this way two of said straps 20 are formed, which are reciprocally flanked (see for example the straps indicated by reference numbers 20a and 20b in FIG. 4). Advantageously all the straps 20 are obtained in pairs in this way. The retaining means 30 comprise a fastening bar 31 which has a preponderant extension direction 310 (in alternative solutions the connection could take place through screw, rivet, plug, Velcro fastenings, seams, etc.). The fastening bar 31 is removably connected to remaining parts of the central support 3. The strip that forms a pair of bands 20 is folded around the fastening bar 31. Appropriately the fastening bar 31 is inserted in a bayonet fashion in the remaining parts of the support 3. In particular the fastening bar 31 is inserted in one of the slots 38 afforded along the lateral surface 35 of the support 3. Such slots 38 are preferably oriented along the directrices of the lateral surface 35 of the support 3 (however, in an alternative solution they could be inclined with respect to such directrix). In particular each pair of straps 20 is constrained by means of a corresponding fastening bar 31.

The generatrix of the lateral surface 35 is not necessarily a straight line, but may be a curved line. Furthermore, the inclined surface 35 may have troughs and/or reliefs due, for example, to the presence of the slots 38 closed by the fastening bars 31 (that generate a lateral surface 35 that is not flat). Appropriately one end of the straps 20, placed at the support 3, extends along a line (preferably a straight line) inclined with respect to the axis 40 of rotation. The fastening bar 31 is inclined with respect to a direction 400 identified by the axis 40 of rotation of the shaft 4.

An imaginary extension of the fastening bar 31 along the preponderant extension direction 310 thereof extends towards the shaft 4 or an imaginary extension of the shaft 4. The fastening bar 31 and/or the corresponding slot may be rectilinear or curved (e.g. defining a helical stretch).

Starting from the central support 3 a first group 21 of said flexible elements 2 in an extended and rectilinear configuration extends upwards and a second group 22 of said flexible elements 2 in an extended and rectilinear configuration extends downwards. In an alternative solution not illustrated the flexible elements 2 of one from among the first and the second group 21, 22 could extend horizontally in an extended and rectilinear configuration. In this way a succession of flexible elements 2 hit the vehicle at different heights simulating an oscillatory motion that optimises the wash. This is a result of the fact that the lateral surface 35 is inclined with respect to the axis 40. Appropriately the central support 3 comprises two opposite bases 36, 37 between which the lateral surface 35 extends. Appropriately any straps 20 extend for at least 50%, preferably at least 75%, of the distance between the two opposite bases 36, 37.

Reference is to be made below by way of example to FIGS. 1a, 1b, 2, 3a, 3b, 4, 5, 6. The first and the second group 21, 22 of straps 20 lie, at least in part, on diametrically opposite positions.

Appropriately the central support 3 is not coaxial with the axis of rotation 40 of the shaft 4.

On this point, the support 3 identifies a longitudinal axis 300 about which the support 3 extends annularly. The longitudinal axis 300 is incident and inclined with respect to the axis of rotation 40 of the shaft 4. In FIGS. 1a, 1b, 2, 3a, 3b, 6 such inclination could even be considered "exaggerated", but this has been done to highlight it better. Appropriately the angle between the axis 300 and the axis 40 is less than 45°, advantageously less than 25°, preferably less than 15°. At the same time such angle is preferably greater than 5°.

Appropriately at least one of the two bases 36, 37 lies on a plane that extends transversally, but not orthogonally to the axis 40 of rotation of the shaft 4 (see for example FIGS. 1a, 1b, 2, 6). This can be repeated advantageously for both bases 36, 37.

Reference should now be made instead to the schematic and alternative solution illustrated in FIGS. 7-10. For the sake of simplicity, in FIG. 7 the flexible elements 2 have not been illustrated which are instead schematically highlighted in the sections of FIGS. 8-10.

The central support 3 comprises a lateral surface 35 comprising a first portion 351 tapered downwards and a second portion 352 tapered upwards that are in succession along the lateral surface 35 following the rotation direction of the support 3. In such case the flexible elements 2 that extend from the first portion 351 hit the vehicle lower down than those that extend from the second portion 352. This alternation of straps 20 that hit the vehicle further down and further up simulates an oscillatory motion of the brush 1.

In this case the axis 300 of the support 3 and the axis 40 of rotation of the rotation shaft 4 extend along the same direction. The lateral surface 35 instead remains inclined with respect to the axis 40 of rotation (at least for 75% of its angular extension about the axis 300; it is to be noted in fact in FIG. 10 that in such specific section the generatrix is parallel to the axis 40).

As exemplified in FIGS. 1a, 1b, 2, 3a, 3b, the brush 1 comprises a plurality of annular supports 3 that are in succession with each other along said shaft 4 and crossed by the same shaft 4.

The subject matter of the present invention is also a brush 1 for a vehicle washing system (see for example FIGS. 11-16).

Figure 11:
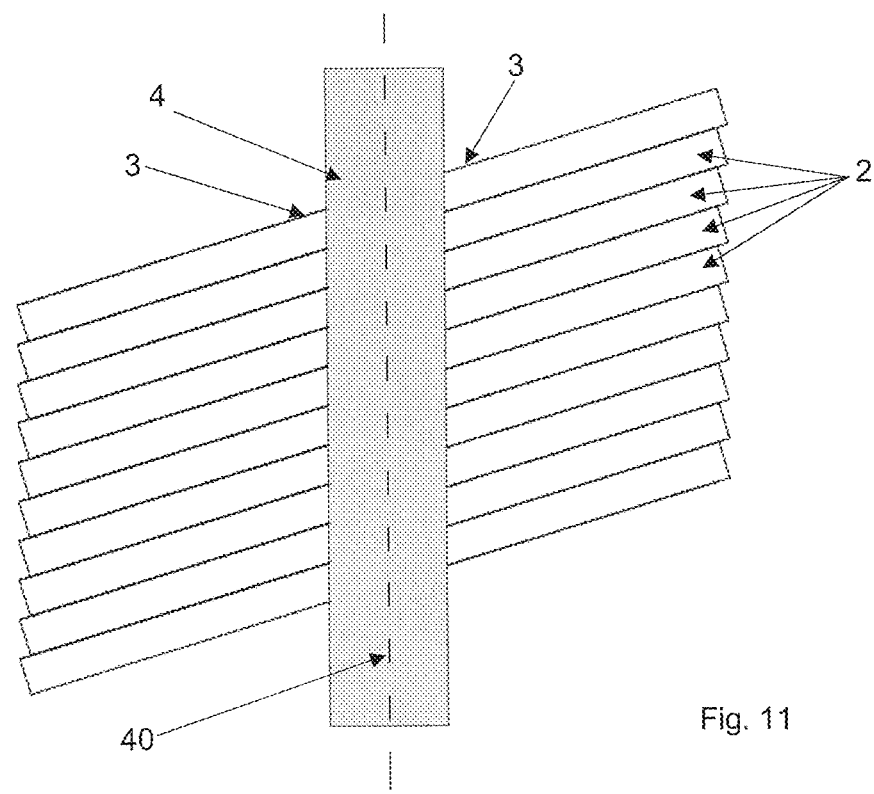
FIG. 11 shows a schematic sectional view of a further solution of a brush according to the present invention.
Figure 12:
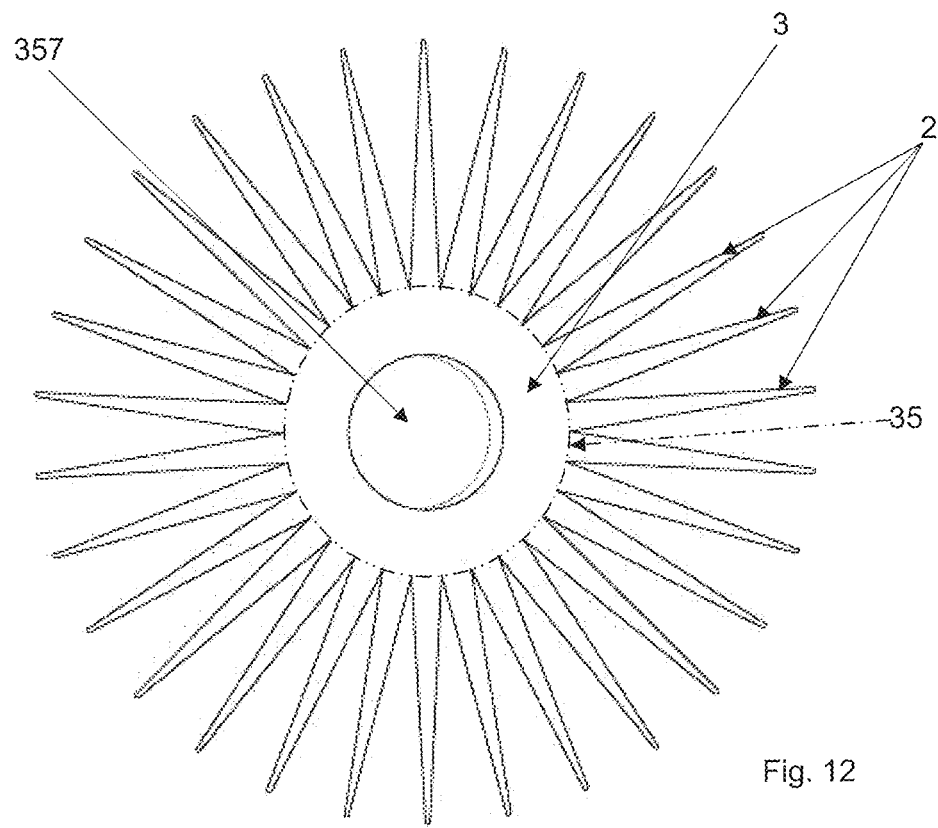
FIG. 12 shows a schematic view from above of a component illustrated in FIG. 11 and resting on a horizontal plane.
Figure 13:
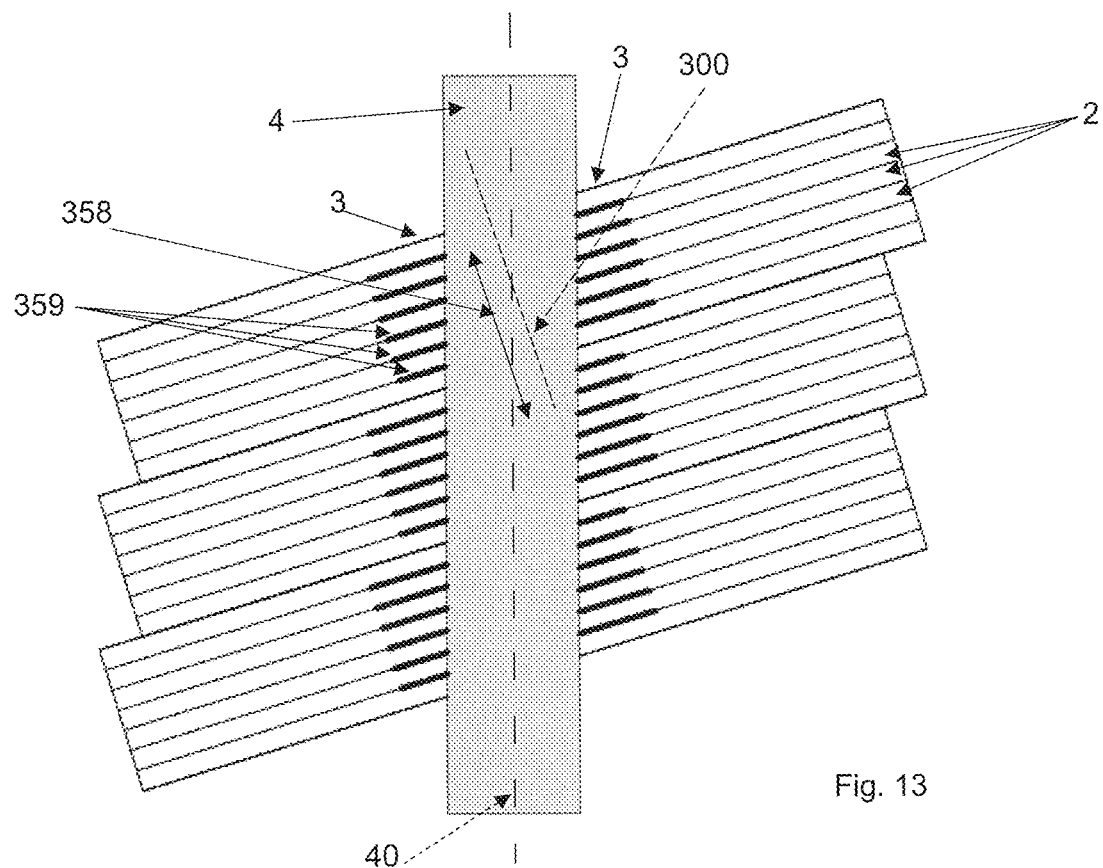
FIG. 13 shows a schematic sectional view of a further solution of a brush according to the present invention.

This brush 1 comprises:
flexible elements 2 intended to come into contact with the vehicle for cleaning and/or drying and/or polishing;
a central annular support 3 from which the flexible elements 2 extend; as exemplified in FIGS. 11 and 13 appropriately the central support 3 and the flexible elements 2 are a single monolithic body;
a shaft 4 rotating about its own axis 40 of rotation; the shaft 4 crosses the central support 3 and places the central support 3 in rotation about the axis 40 of rotation.

The central support 3 defines an upper surface 356 that circumscribes a circle 357 or another figure crossed by the shaft 4 (it is the upper section of the hole that crosses the central support 3; such hole is normally crossed by the shaft 4); a straight line passing through the geometric centre of gravity of said circle 357 (or other figure) and orthogonal to said circle 357 (or other figure) is inclined with respect to the axis 40 of rotation of the shaft 4. Such inclination is fixed during operation. Such inclination is advantageously comprised between 5° and 25°.

Figure 15:
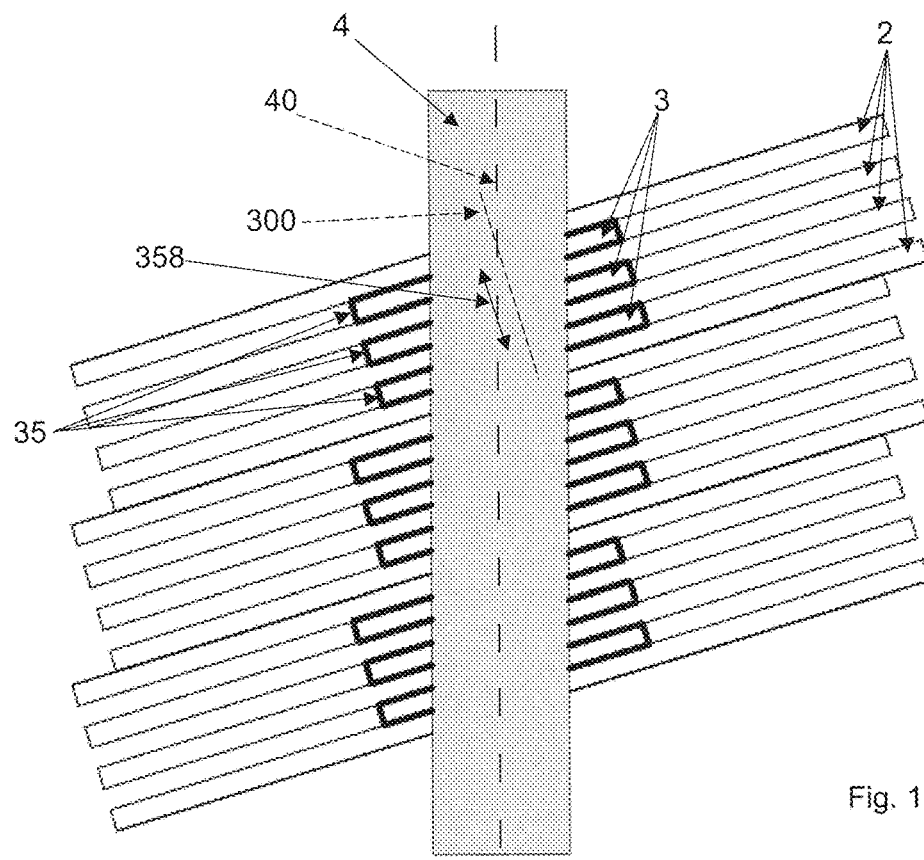
FIG. 15 shows a schematic sectional view of a further solution of a brush according to the present invention.

For a stretch of the perimeter of said circle 357 (or other geometric figure) the central support 3 extends upwards from the shaft 4, while for a stretch of the perimeter of said circle 357 (or other geometric figure) the central support 3 extends downwards from the shaft 4 (see FIGS. 11 and 13). Appropriately, the support 3 extends upwards for at least one third (or even half) of the perimeter of said circle 357 (or other figure). The support 3 extends downwards for at least one third (or even half) of the perimeter of said circle 357 or other figure. In fact, the support 3 is inclined with respect to the horizontal plane and therefore it partially projects upwards and partially projects downwards. Appropriately the brush 2 comprises a plurality of central supports 3 stacked along a direction 358 inclined with respect to the axis of rotation of the shaft 4 (as previously indicated, such inclination is advantageously comprised between 5° and 25°; FIGS. 11 and 13 and 15 exaggerate such inclination for highlighting it better). The supports 3 extend in thickness along the stacking direction. As exemplified in FIGS. 11 and 13 each of said supports 3 is in a single body with a plurality of flexible elements 2 that extend in spoke fashion. The interface between each support 3 and the flexible elements 2 that extend therefrom defines a lateral surface 35 of the support 3 (see broken line of FIG. 12).

Figure 16:
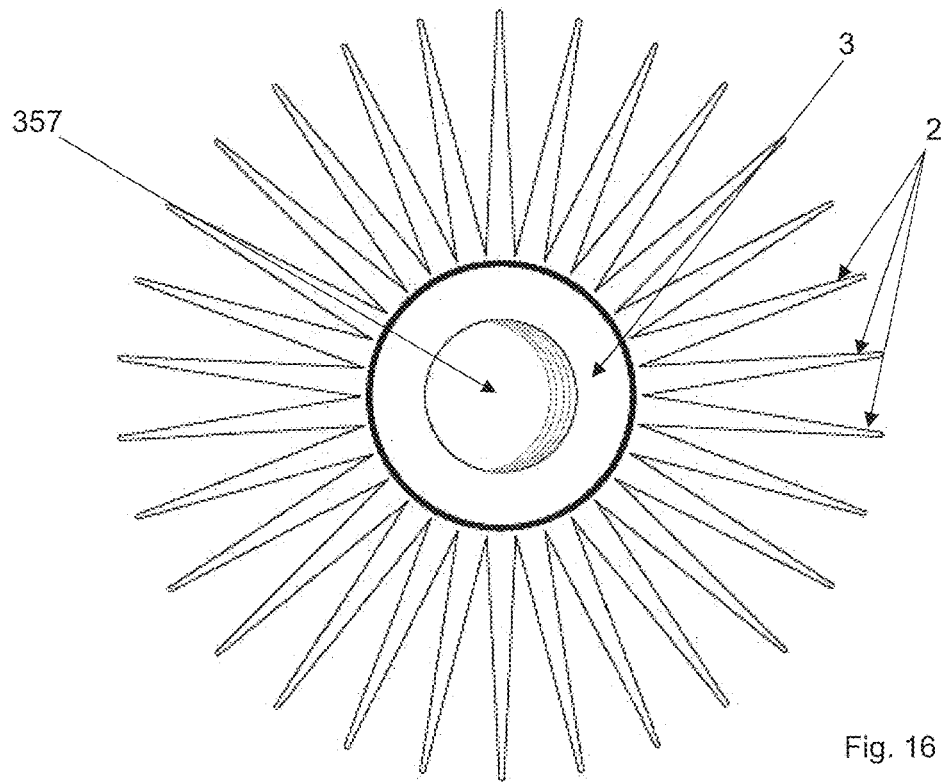
FIG. 16 shows a schematic view from above of a component illustrated in FIG. 15 and resting on a horizontal plane.

Reference is now made to the solutions of FIGS. 15 and 16. In that case the central support 3 also acts as a spacer ring (separating two layers of stacked flexible elements 2). The flexible elements 2 extend from the support 3 (see FIG. 15). In particular the flexible elements 2 extend in spoke fashion moving away from the central support 3. Such flexible elements 2 are connected, for example by gluing, to the central support 3 overlapping such flexible elements. Reference is now made to the solutions of FIGS. 11 and 12. In that case the central support 3 and the flexible elements 2 are integrated in a single monolithic body; the central support 3 is therefore the internal portion of the monolithic body. In that case a plurality of central supports 3 each associated with corresponding flexible elements 2 that extend in spoke fashion are stacked onto each other.

Figure 14:
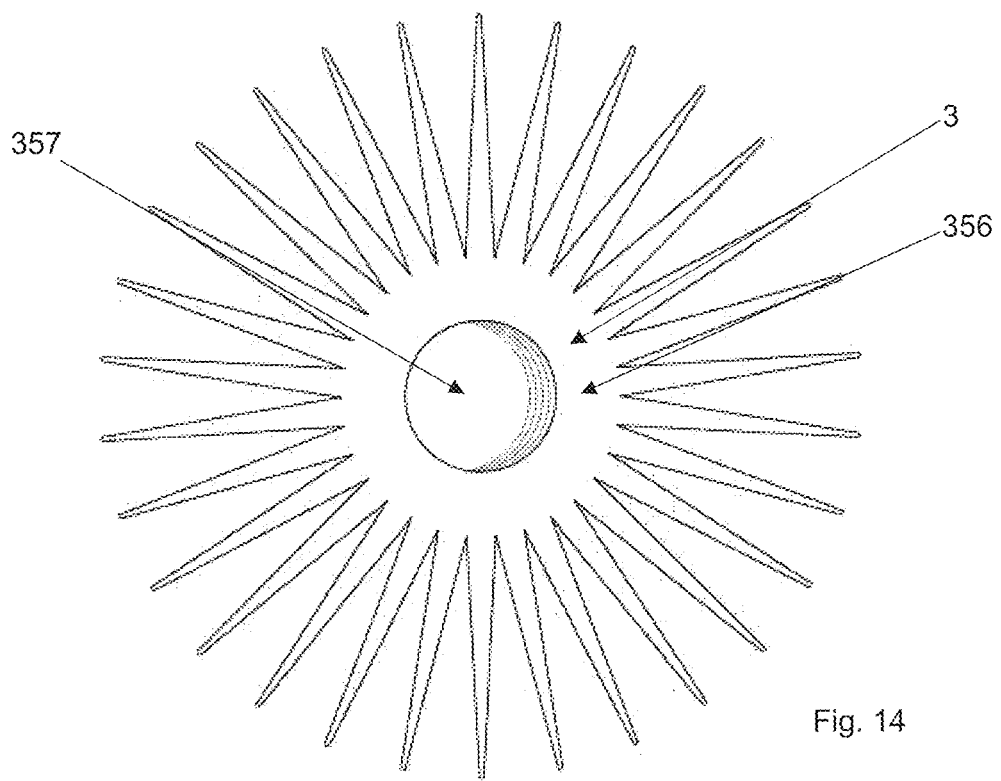
FIG. 14 shows a schematic view from above of a component illustrated in FIG. 13 and resting on a horizontal plane.

Reference is made to the solution of FIGS. 13 and 14. Such solution differs from the previous one as in that case the central supports 3 are glued to each other to form an assembly (in such figures the layer of glue is indicated by reference number 359).

The subject matter of the present invention is also an operating method of a brush 1 of an automatic vehicle washing system. Conveniently, such brush 1 may be of the type having one or more of the characteristics described hereinabove. Appropriately the method comprises the step of placing in rotation a shaft 4 that rotates about an axis 40 of rotation. The shaft 4 crosses and draws in rotation a central annular support 3 about which flexible elements 2 are applied and are intended to come into contact with the vehicle for cleaning and/or drying and/or polishing.

The central support 3 comprises a lateral surface 35, from which the flexible elements 2 extend, which is inclined with respect to the axis 40 of rotation of the shaft 4. The lateral surface 35 is appropriately annular.

The central support 3 comprises two opposite bases 36, 37 between which a lateral surface 35 extends. The flexible elements 2 could advantageously be straps 20. Advantageously in that case the straps 20 extend for at least 50%, preferably at least 75%, of the distance between the two opposite bases 36, 37.

A first pair 21 of straps 2 are adjacent to each other and at least at a predetermined rotation speed of the shaft 4 an orthogonal projection thereof on the axis of rotation 40 is closer to a first axial end 41 of said brush 1 with respect to at least a second pair of said straps 2 (also the straps of said second pair are adjacent to each other). This happens for the entire rotation (at 360°) about the axis 40 of the shaft 4. For example, in the case of FIG. 2 point H representing the upper straps 20 is closer to the first end 41 of the shaft 4 with respect to the point K representing the lower straps 20.

Adjacent straps 20 means two straps 20a, 20b that extend from the same central support 3 and are in adjacent succession with respect to a rotation about the axis 40 of the support 3.

Figure 2:
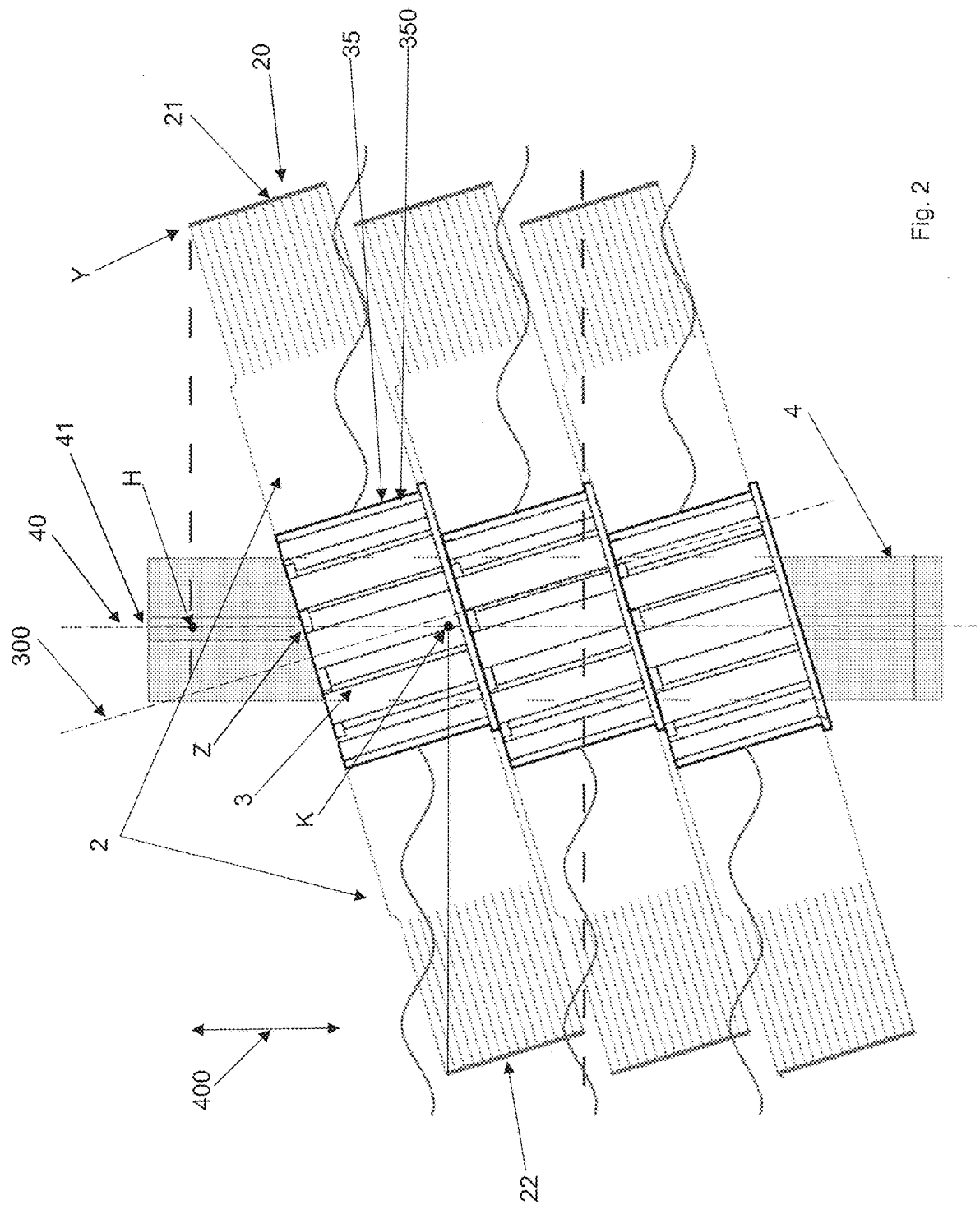
FIG. 2 shows a detail of the brush according to the present invention.
Figure 3A:
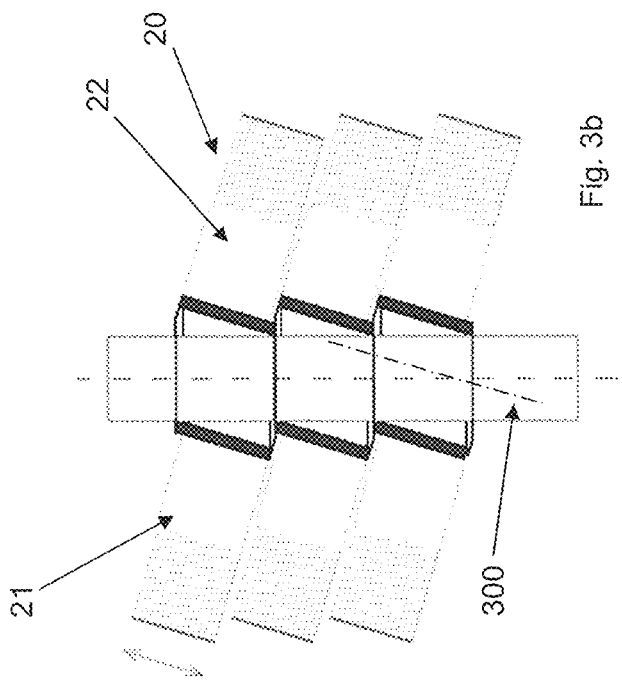
FIGS. 3a and 3b show a brush according to the present invention, alternative to that of FIG. 1 and at two different moments of the rotation.
Figure 3B:
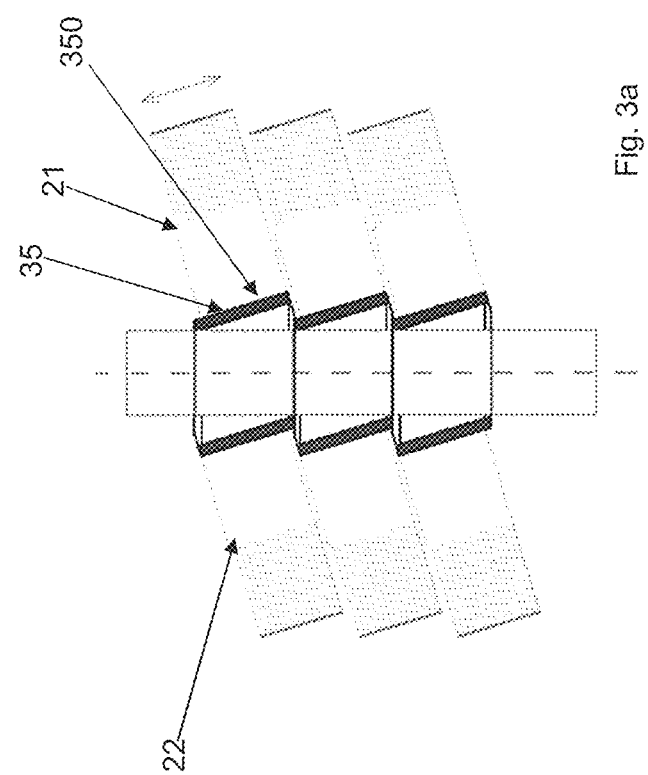
Figure 4:
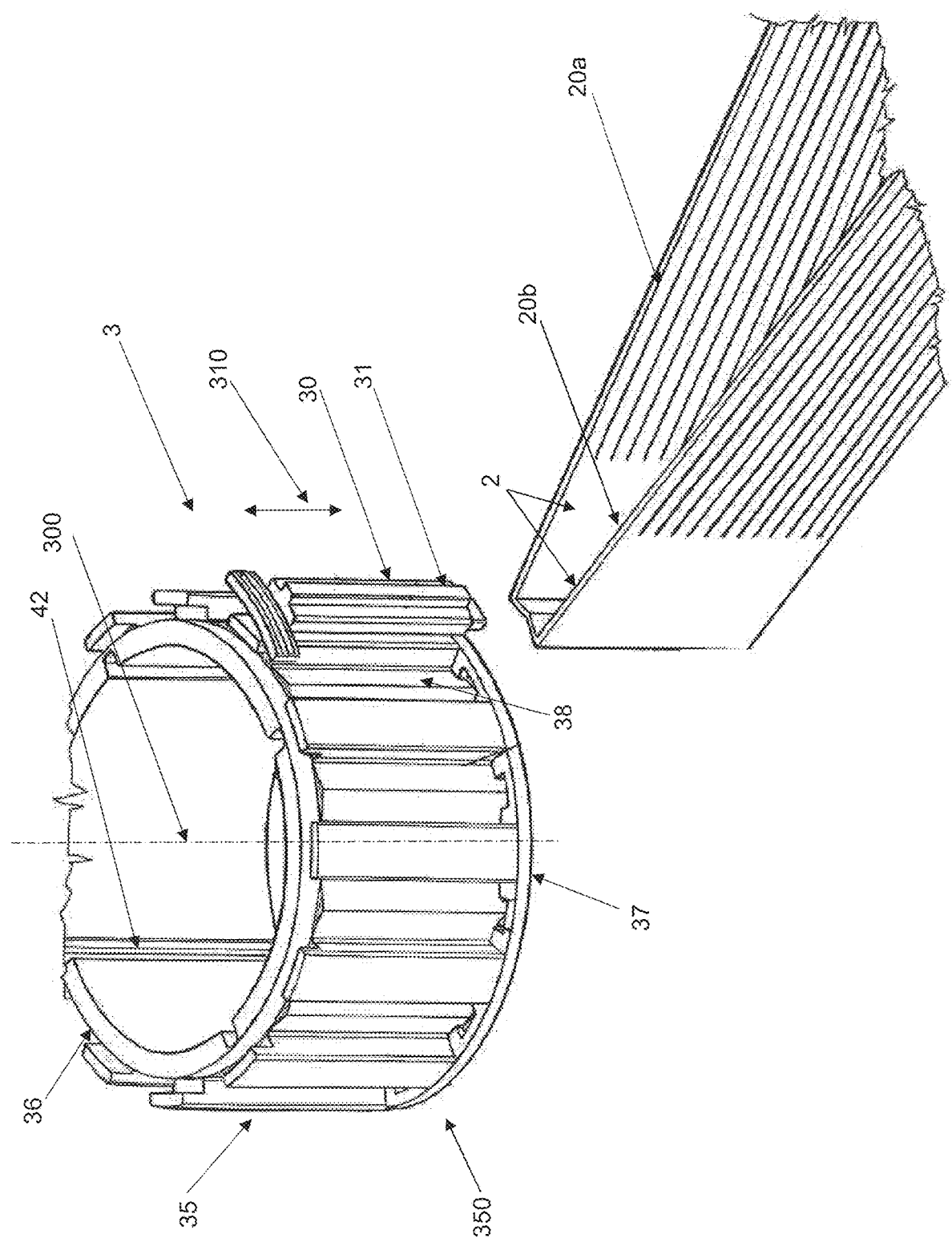
FIG. 4 shows an exploded view of the brush according to the present invention.

Furthermore, still with reference to FIG. 2, as the strap 20 is inclined, the distance between points Y and H is shorter than the distance between points Y and Z. In other words if the strap 20 is taut and straight, a point that lies at an end of the strap 20 has a distance from the axis 40 that is shorter if evaluated in the radial sense rather than along a longitudinal extension direction of the strap 20.

Appropriately (see solution of FIG. 1a, 1b, 2, 3a, 3b, 6) the axis 40 of rotation of the shaft 4 and a longitudinal axis 300 of the central support 3 extend along two different directions.

In an alternative solution (see FIGS. 7-10), the lateral surface 35 of the support 3 comprises a first portion 351 tapered downwards and a second portion 352 tapered upwards that are in succession along the lateral surface 35 following the rotation direction of the support 3.

When the shaft 4 is placed in rotation, the straps 20 that extend from the first portion 351 contact the vehicle lower down than the straps 20 that extend from the second portion 352. In that case, the axis of rotation 40 of the shaft 4 and the longitudinal axis 300 of the central support 3 advantageously extend along the same direction, in particular they coincide.

The present invention achieves important advantages.

Above all, the flexible elements 2 that extend from an inclined surface with respect to the axis 40 of rotation allow the brush 1 to acquire the rotatory motion, but also to simulate the wave motion. Furthermore, the inclination solves the problems connected with the axial distance existing between the flexible elements 2 placed at a junction zone of two consecutive supports 3. This allows the cleaning power and the friction surface to be increased as well as allowing more uniform cleaning. The inclined elements 2 also gradually impact the surfaces having a more delicate effect on the paints and a reduction in noise.

The invention as it is conceived is susceptible to numerous modifications and variations, all falling within the scope of the inventive concept characterising it. Further, all the details can be replaced with other technically-equivalent elements. In practice, all the materials used, as well as the dimensions, can be any according to requirements.

The invention claimed is:

1. A brush for a vehicle washing system comprising:
    flexible elements (2) intended to come into contact with the vehicle for cleaning and/or drying and/or polishing;
    a central annular support (3) from which the flexible elements (2) extend;
    a shaft (4) rotating about its own axis (40) of rotation, said shaft (4) crossing said central support (3) and placing said central support (3) in rotation about said axis (40) of rotation;
characterised in that the central support (3) comprises a lateral surface (35), from which said flexible elements (2) extend, which is inclined with respect to the axis (40) of rotation of the shaft (4); said support (3) identifies a longitudinal axis (300) about which the support (3) extends annularly, said longitudinal axis (300) being incident and inclined with respect to the axis (40) of rotation of the shaft (4).

2. The brush according to claim 1, characterised in that starting from the central support (3) a first group (21) of said flexible elements (2) in an extended and rectilinear configuration extends upwards and a second group (22) of said flexible elements (2) in an extended and rectilinear configuration extends downwards; the first and the second group (21, 22) of said flexible elements (2) lie in diametrically opposite positions.

3. The brush according to claim 1, characterised in that said central support (3) comprises a flexible band (39) that is annularly folded.

4. The brush according to claim 3, characterised in that said flexible elements (2) comprise longitudinal strings; said band (39) comprises a plurality of housings (390) distributed about the shaft (4); from a plurality of said housings (390) a corresponding bunch of said longitudinal strings extends.

5. The brush according to claim 1, characterised in that the flexible elements (2) comprise longitudinal straps (20).

6. The brush according to claim 5, characterised in that the brush comprises a strip; the central support (3) comprises retaining means (30) for retaining the strip folded about its own transversal axis to form two of said straps (20) which are reciprocally flanked; said retaining means (30) comprises a fastening bar (31) which has a preponderant extension direction (310):
    i) which is inclined with respect to a direction (400) identified by the axis (40) of rotation of the shaft (4);
    ii) such that an imaginary extension of said fastening bar (31) along said preponderant extension direction (310) extends upwards (4) or an imaginary extension of the shaft (4) along the axis of rotation (40).

7. The brush according to claim 5, characterised in that an end of the straps (20), placed at the support (3), extends along a line that is inclined with respect to the axis (40) of rotation.

8. The brush according to claim 1, characterised in that the brush comprises a plurality of annular supports (3) that are in succession with each other along said shaft (4) and crossed by the same shaft (4).

9. A brush for a vehicle washing system comprising:
    flexible elements (2) intended to come into contact with the vehicle for cleaning and/or drying and/or polishing;
    a central annular support (3) from which flexible elements (2) extend;
    a shaft (4) rotating about its own axis (40) of rotation, said shaft (4) crossing said central support (3) and placing said central support (3) in rotation about said axis (40) of rotation;
characterised in that the central support (3) defines an upper surface that circumscribes a circle or another figure crossed by the shaft (4); a straight line passing through the geometric centre of gravity of said circle or other figure and orthogonal to said circle or other figure is inclined with respect to the axis (40) of rotation of the shaft (4).

10. A brush for a vehicle washing system comprising:
    flexible elements (2) intended to come into contact with the vehicle for cleaning and/or drying and/or polishing;
    a central annular support (3) from which the flexible elements (2) extend;
    a shaft (4) rotating about its own axis (40) of rotation, said shaft (4) crossing said central support (3) and placing said central support (3) in rotation about said axis (40) of rotation;
the central support (3) comprises a lateral surface (35), from which said flexible elements (2) extend, which is inclined with respect to the axis (40) of rotation of the shaft (4); said lateral surface (35) comprising a first portion (351) tapered downwards and a second portion (352) tapered upwards that are in succession along the lateral surface (35) following the rotation direction of the support (3).

* * * * *